United States Patent
Akasaka et al.

(10) Patent No.: US 8,293,667 B2
(45) Date of Patent: Oct. 23, 2012

(54) SINTERED CERAMIC, SLIDE PART THEREFROM, AND PROCESS FOR PRODUCING SINTERED CERAMIC

(75) Inventors: Kazuyuki Akasaka, Hitachinaka (JP); Kiyoshi Kawai, Hitachinaka (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/087,516

(22) PCT Filed: Feb. 22, 2007

(86) PCT No.: PCT/JP2007/053305
§ 371 (c)(1),
(2), (4) Date: Nov. 18, 2008

(87) PCT Pub. No.: WO2007/097402
PCT Pub. Date: Aug. 30, 2007

(65) Prior Publication Data
US 2009/0149309 A1    Jun. 11, 2009

(30) Foreign Application Priority Data

Feb. 24, 2006  (JP) ................ P2006-048406
Jul. 20, 2006   (JP) ................ P2006-198533

(51) Int. Cl.
*C04B 35/52*   (2006.01)
*C04B 35/56*   (2006.01)
*C01B 31/36*   (2006.01)

(52) U.S. Cl. .................... 501/88; 501/90; 423/345

(58) Field of Classification Search ............ 501/88, 501/90, 99; 423/345; 428/698
See application file for complete search history.

(56) References Cited

U.S. PATENT DOCUMENTS

| | | | |
|---|---|---|---|
| 4,692,418 A * | 9/1987 | Boecker et al. | 501/90 |
| 5,998,318 A | 12/1999 | Takanami et al. | |
| 6,716,800 B2 * | 4/2004 | Demendi et al. | 508/107 |
| 7,015,165 B2 * | 3/2006 | Wilkins | 501/90 |
| 2002/0160902 A1 | 10/2002 | Lesniak et al. | |

FOREIGN PATENT DOCUMENTS

| | | |
|---|---|---|
| JP | 61-43310 | 6/1984 |
| JP | S61-043310 A * | 6/1984 |
| JP | 59-131577 | 7/1984 |
| JP | S59-131577 A * | 7/1984 |

(Continued)

OTHER PUBLICATIONS

International Preliminary Report on Patentability issued Sep. 4, 2008, in Application No. PCT/JP2007/053305.

(Continued)

*Primary Examiner* — Noah Wiese
(74) *Attorney, Agent, or Firm* — Antonelli, Terry, Stout & Kraus, LLP.

(57) ABSTRACT

It is an object of the invention to provide a ceramic sintered body that has a dense structure and minimal cracking and that exhibits excellent sliding properties even in a non-lubricated state, as well as a process for its production and sliding parts that employ the same. According to a preferred mode, the sintered body of the invention comprises silicon carbide as the parent material and further contains a solid lubricant A with a mean particle size of no greater than 5 μm and a solid lubricant B with a mean particle size of 10-70 μm.

14 Claims, 6 Drawing Sheets

FOREIGN PATENT DOCUMENTS

| | | |
|---|---|---|
| JP | 60-112670 | 6/1985 |
| JP | S60-112670 A * | 6/1985 |
| JP | 61-043310 | 3/1986 |
| JP | 61-63569 | 4/1986 |
| JP | 61-063569 | 4/1986 |
| JP | 10-251063 | 9/1998 |
| JP | 10-3350394 | 9/2002 |
| JP | 2002-265271 | 9/2002 |
| JP | 2002-326873 | 11/2002 |
| JP | 2002-338358 | 11/2002 |

OTHER PUBLICATIONS

Japanese Official Action dated Apr. 17, 2012, for JP Application No. 2008-501754.

* cited by examiner

SINTERED CERAMIC, SLIDE PART THEREFROM, AND PROCESS FOR PRODUCING SINTERED CERAMIC

TECHNICAL FIELD

The present invention relates to a ceramic sintered body, to sliding parts using it and to a process for production of the ceramic sintered body.

BACKGROUND ART

Most sintered silicon carbides are extremely hard and exhibit good lubricity when used with water lubrication, while their wear resistance and chemical resistance are also excellent. They are therefore widely used in sliding parts such as mechanical seals, bearings and the like. For mechanical seal applications, in particular, they may be used even in situations with a high PV value, which represents the product of the contact pressure and rotation rate on the sliding surface, and therefore sintered silicon carbides (silicon carbide ceramics) are considered to be highly useful materials. Moreover, it is well known that sintered silicon carbides can be used with even higher PV values if pores are introduced therein.

Conventional sintered silicon carbides have exhibited satisfactory properties against sliding friction when liquid films are formed on the sliding surfaces (this will hereinafter be referred to as "lubricated state"). However in the complete absence of liquid films on sliding surfaces or with inadequate formation of liquid films, (this will hereinafter be referred to as "non-lubricated state"), they create solid friction and have therefore tended to cause seizing of sliding surfaces and abnormal wear as a result, when the frictional coefficient is notably increased. Consequently, pure sintered silicon carbides have not necessarily been satisfactory in terms of sliding properties and are less than optimal for use in a non-lubricated state.

As silicon carbide-based sintered bodies with low surface friction, there have been hitherto proposed materials produced by adding carbon materials such as graphite as solid lubricants to silicon carbide. For example, a sintered body obtained by adding carbon black at 1-5 vol % to silicon carbide powder has been disclosed (Patent document 1). The sintered body is described as having a low frictional coefficient with water lubrication. A sintered body obtained by adding carbon black at 6.0-12.0 vol % to silicon carbide powder has also been disclosed (Patent document 2). This sintered body exhibits a satisfactory frictional coefficient in oil tanks.

Composite materials obtained by adding graphite to silicon carbide powder have also been proposed. For example, Patent document 3 discloses a sintered body containing 10-30 wt % flake natural graphite with a mean particle size of 8-100 µm, and having a relative density of 80-92%.

There have also been disclosed ceramic composite materials with a 99.9 wt %-70 wt % silicon carbide content and a 0.1 wt %-30 wt % carbon content, wherein the silicon carbide has a mean particle size of greater than 10 µm and a microstructure with two particle structure modes, while the carbon has a mean particle size of less than 10 µm (see Patent document 4).

[Patent document 1] Japanese Examined Patent Publication SHO No. 61-043310
[Patent document 2] Japanese Unexamined Patent Publication SHO No. 61-063569
[Patent document 3] Japanese Patent Publication No. 3350394
[Patent document 4] Japanese Unexamined Patent Publication No. 2002-326873

DISCLOSURE OF THE INVENTION

Problems to be Solved by the Invention

The sintered bodies mentioned above, however, while having smaller frictional coefficients than pure silicon carbide sintered bodies, are not sufficiently impervious to seizing in a non-lubricated state, and therefore it has been difficult to obtain excellent sliding properties. Also, even when excellent sliding properties are obtained, the sintered bodies have low density and insufficient sealing properties, and are therefore more susceptible to cracking.

The present invention has been accomplished in light of these circumstances, and its object is to provide a ceramic sintered body that has a dense structure and minimal cracking and that can exhibit excellent sliding properties even in a non-lubricated state, as well as sliding parts that employ it. It is another object of the invention to provide a process for production of the ceramic sintered body.

Means for Solving the Problems

The present inventors have been led to the following discovery after much detailed research on the causes of the aforementioned drawbacks of the prior art. Specifically, it was found that silicon carbide sintered bodies tend to have lower frictional coefficients when the amount of solid lubricant is increased or the particle size of the solid lubricant is increased.

For example, since graphite formed by adding carbon black and firing produces very fine particles, the effect of frictional coefficient reduction has been minimal compared to using coarse graphite particles. As mentioned above, Patent document 1 and 2 describe sintered bodies containing graphite formed by firing carbon black containing added silicon carbide. The material described in Patent document 1 has a large frictional coefficient of about 0.40, and it has been difficult to sufficiently prevent seizing with this material. The material described in Patent document 2 also has a large frictional coefficient in air, such that it has been difficult to sufficiently prevent seizing with this material as well.

Addition of graphite in large amounts has been considered as a way of obtaining a more excellent frictional coefficient reducing effect. In this case, however, sintering of the silicon carbide is inconveniently inhibited by the graphite in the firing step during production of the sintered body, and this has hampered efforts to obtain dense sintered bodies when sintering is carried out in the absence of pressure, for example. Patent document 3, for example, discloses a sintered body obtained by adding a large quantity of natural graphite. When this sintered body is used as a mechanical seal, it tends to form penetration leaks and therefore exhibits insufficient sealing properties. The same document describes impregnating the sintered body with a resin and subjecting the impregnated material to carbonization or graphitization to form a sealing material, but because this type of sintered body cannot be easily manufactured and the production costs are also high, such a method is in need of improvement.

On the other hand, addition of coarse (large particle size) graphite particles has also been considered as a means of improving the sliding properties. However, the ceramic composite material described in Patent document 4 that contains coarse graphite particles has exhibited cracking due to differences in the elastic behaviors of the coarse graphite particles and silicon carbide (SiC), for example during relaxation after pressing during the production process, and therefore the compacts obtained therefrom often contain cracks. The comparative examples of this document demonstrate that addition of coarse graphite with a mean particle size of about 40 μm results in cracking in the sintered body around the graphite particles.

Applying knowledge gained by close examination of the prior art as described above, the present inventors have completed this invention upon finding that it is possible to minimize the aforementioned drawbacks of the prior art by adding a combination of materials with different mean particle sizes as a solid lubricant.

Specifically, the ceramic sintered body of the invention is characterized by comprising silicon carbide as the parent material and by further containing a solid lubricant A with a mean particle size of no greater than 5 μm and a solid lubricant B with a mean particle size of 10-70 μm.

The ceramic sintered body of the invention therefore contains a combination of a fine solid lubricant A and a coarse solid lubricant B. The ceramic sintered body has a small frictional coefficient due to the coarse solid lubricant B by which it exhibits excellent sliding properties, while the presence of the fine solid lubricant A reduces the difference in elastic behavior during the manufacturing process and consequently results in less cracking. Moreover, since the presence of the coarse solid lubricant B lowers the frictional coefficient so that the fine solid lubricant A does not need to be added in an excessive amount, sintering of the silicon carbide is adequately promoted during firing and a dense structure can therefore be obtained.

Solid lubricant A and solid lubricant B in the ceramic sintered body of the invention are preferably both graphite. Solid lubricants made of graphite are particularly satisfactory in terms of improving the sliding properties of sintered bodies comprising silicon carbide as the parent material.

The ceramic sintered body of the invention more preferably contains solid lubricant A at 3-10 parts by weight and solid lubricant B at 2-8 parts by weight with respect to 100 parts by weight of silicon carbide. Such ceramic sintered bodies comprise the solid lubricants A and B in a good balance, they have excellent sliding properties and a structure with very high density and minimal cracking.

More specifically, solid lubricant A is preferably graphite obtained by firing carbon black or graphite obtained by firing a thermosetting resin. Graphite obtained in this manner is suitable as solid lubricant A and can improve the sliding properties of the sintered body while also facilitating formation of a dense structure.

On the other hand, artificial graphite is preferred for solid lubricant B. Artificial graphite undergoes little variation in particle size even during ordinary ceramic production processes such as depicted in FIG. 1. Therefore, a ceramic sintered body containing artificial graphite as solid lubricant B will be able to stably retain the solid lubricant B and exhibit excellent sliding properties.

The total content of solid lubricant A and solid lubricant B is preferably 5-15 parts by weight with respect to 100 parts by weight of silicon carbide. The sintered body will thus exhibit satisfactory sliding properties while maintaining the original hardness of the sintered silicon carbide, as well as excellent properties including wear resistance and chemical resistance.

The ceramic sintered body of the invention preferably has a relative density of 92% or greater. The ceramic sintered body will thus have excellent density while exhibiting superior sealing properties when used as a mechanical seal or the like.

Also, as mentioned above, addition of large amounts of fine solid lubricants to improve the sliding properties in the prior art has tended not to yield dense sintered bodies by sintering under non-pressurized conditions. According to the invention, however, wherein a fine solid lubricant A is included in combination with a coarse solid lubricant B, it is possible to achieve sufficient sliding properties even with a small added amount of the fine starting material for formation of the solid lubricant A during manufacture of the ceramic sintered body. Therefore, production of a ceramic sintered body of the invention allows adequate sintering of the silicon carbide and yields a product with a dense structure even when the sintering is carried out in the absence of pressure.

The silicon carbide in the ceramic sintered body of the invention is more preferably αSiC. Because αSiC has a stable crystal structure it yields stable sintered bodies, while its low cost can also reduce production cost for the ceramic sintered body.

The invention further provides sliding parts using the aforementioned ceramic sintered body of the invention. Such sliding parts, being composed of a ceramic sintered body of the invention as described above, have a dense structure and minimal cracking as well as excellent sliding properties even in a non-lubricated state.

The ceramic sintered body of the invention can be more satisfactorily obtained by a production process comprising a step of firing a mixture containing silicon carbide, a thermosetting resin and carbon black with a mean particle size of no greater than 150 nm, as well as artificial graphite with a mean particle size of 10-70 μm. In this production process, the thermosetting resin or carbon black forms fine graphite as a result of firing, while the artificial graphite with a mean particle size of 10-70 μm remains as coarse graphite. This results in satisfactory formation of a ceramic sintered body according to the invention.

More specifically, the process for production of a ceramic sintered body according to the invention preferably comprises a step of firing a mixture containing 2-8 parts by weight of carbon black with a mean particle size of no greater than 150 nm, 2-8 parts by weight of artificial graphite with a mean particle size of 10-70 μm and 1-3 parts by weight of a thermosetting resin in terms of carbon, with respect to 100 parts by weight of silicon carbide powder. According to this production process it is possible to obtain ceramic sintered bodies with excellent sliding properties and dense structures, and to effectively reduce cracking during the production steps.

The thermosetting resin used in the production process of the invention preferably contains a phenol resin and/or furan resin. Such a thermosetting resin reacts with and removes the oxidation film on the surfaces of the silicon carbide (SiC) particles during firing, thus functioning as a sintering aid. Sintering is therefore more satisfactorily promoted if this type of thermosetting resin is used.

Effect of the Invention

The ceramic sintered body of the invention is capable of exhibiting more excellent sliding properties than conventional silicon carbide sintered bodies even in a non-lubricated state, while it also has a dense structure and minimal cracking, making it suitable for sliding parts.

EXPLANATION OF SYMBOLS

Figure 1:
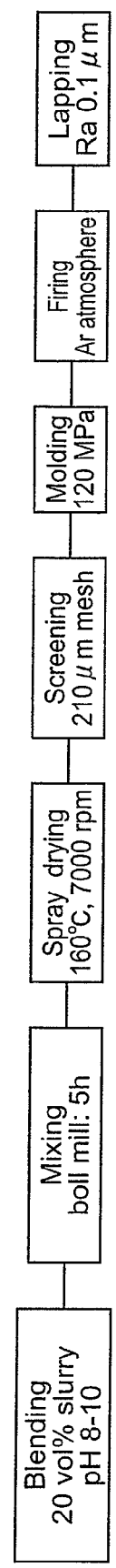
FIG. 1 is a flow chart showing the production steps for the sintered bodies of the examples and comparative examples.

1: Mating ring, 2: seal ring, 3: spring, 4: fixed secondary seal, 5: rotating secondary seal, 6: rotation axis.

BEST MODE FOR CARRYING OUT THE INVENTION

Preferred modes of the invention will now be explained.

A preferred construction for the ceramic sintered body will be described first. A preferred embodiment of the ceramic sintered body contains a silicon carbide ceramic as the parent material and at least two solid lubricants with different mean particle sizes. The solid lubricant in the ceramic sintered body is present at the grain boundaries or in the grains of the ceramic sintered body, or both. The "grain boundaries" are the regions between the crystal grains composing the ceramic sintered body, and "in the grains" refers to the regions inside the crystal grains.

The silicon carbide parent material may be either the α or β type, but the α type (αSiC) is preferred from the viewpoint of a stable crystal structure and lower cost.

The solid lubricant comprises at least two types, a fine solid lubricant with a mean particle size of no greater than 5 μm (hereinafter referred to as "solid lubricant A") and a coarse solid lubricant with a mean particle size of 10-70 μm (hereinafter referred to as "solid lubricant B"). As such solid lubricants there may be mentioned graphite, hexagonal boron nitride and molybdenum disulfide. Graphite is preferred among the above for solid lubricants A and B because it produces excellent sliding properties and is inexpensive.

The mean particle size can be measured by the following method. Specifically, the solid lubricant is first observed at 300-8000× magnification using a scanning electron microscope (SEM, for example, a S-4500 by Hitachi, Ltd.), and multiple grains are selected at random. For greater precision, it is preferred to select at least 200 grains. The maximum and minimum sizes of each of the selected grains are then measured, and the square root of their product is calculated as the particle size. The sum of the particle sizes of all of the selected grains is divided by the number of particles selected. This calculated value is recorded as the mean particle size.

Instead of directly observing the particles, in cases where the particles are inside the sintered body it is possible to determine the mean particle size by a method of observing a cross-section of the sintered body and conducting similar measurement for particles exposed at the cross-section. This mean particle size measuring method is not limited to particles and may be applied for pores formed in the ceramic sintered body as well. The "mean particle sizes" referred to hereunder are all values measured by the same method.

When the solid lubricants A and B in the ceramic sintered body are composed of the same material (for example, graphite), they can be distinguished by SEM or the like and classified based on their particle size distribution peaks. The distinguished solid lubricants A and B may then be observed in the manner described above to calculate their mean particle sizes.

The solid lubricant A preferably has a mean particle size of no greater than 5 μm, more preferably 20 nm-5 μm and even more preferably 30 nm-3 μm. If the mean particle size of the solid lubricant A exceeds 5 μm, the distances between particles of the solid lubricant in the silicon carbide parent material will become excessive, resulting in more cracking during shaping of the sintered body. Solid lubricant A preferably contains both graphite obtained by firing carbon black and graphite obtained by firing a thermosetting resin.

Solid lubricant B preferably has a mean particle size of 10-70 μm, more preferably 20-60 μm and even more preferably 30-50 μm. If the mean particle size is less than 10 μm, the sliding properties of the ceramic sintered body will be insufficient. If it exceeds 70 μm, however, the difference in elastic behavior compared to silicon carbide will become more notable during shaping, and the ceramic sintered body will be more susceptible to cracking. Solid lubricant B is preferably composed of artificial graphite.

The preferred contents for solid lubricants A and B in the ceramic sintered body are as follows. Specifically, the content of solid lubricant A is preferably 3-10 parts by weight, more preferably 3-8 parts by weight and even more preferably 3-6 parts by weight with respect to 100 parts by weight of silicon carbide. If the content of solid lubricant A is less than 3 parts by weight, the ceramic sintered body will be more susceptible to cracking. If it exceeds 10 parts by weight, on the other hand, it will be necessary to reduce the amount of solid lubricant B added in order to obtain a ceramic sintered body with a dense structure.

The content of solid lubricant B is preferably 2-8 parts by weight, more preferably 2-6 parts by weight and even more preferably 3-6 parts by weight with respect to 100 parts by weight of silicon carbide. If the content of solid lubricant B is less than 2 parts by weight, it will be more difficult to obtain excellent sliding properties. If it exceeds 8 parts by weight, on the other hand, the ceramic sintered body will be more susceptible to cracking and it will be necessary to reduce the amount of solid lubricant A added.

The total content of the solid lubricant A and solid lubricant B in the ceramic sintered body of the invention is preferably 5-15 parts by weight and more preferably 5-12 parts by weight with respect to 100 parts by weight of silicon carbide. If the total content is less than 5 parts by weight, it will be more difficult to obtain satisfactory sliding properties in a non-lubricated state. If it is greater than 15 parts by weight, on the other hand, the mechanical properties (strength, hardness, etc.) of the ceramic sintered body and its sealing properties when used as a mechanical seal will tend to be insufficient.

The ceramic sintered body has a relative density of preferably at least 92%, more preferably at least 94% and even more preferably 95-100% of the theoretical density. If the relative density of the ceramic sintered body is less than 92%, the sintered body will fail to have a sufficiently dense structure, and leaking may tend to occur when the ceramic is applied as a mechanical seal or the like.

The ceramic sintered body may contain spherical pores. Spherical pores will tend to improve the sliding properties in a lubricated state. The spherical pores preferably have mean particle sizes of 40-100 μm. The spherical pores in the ceramic sintered body are most preferably formed in a dispersed manner in the parent material.

A preferred process for production of a ceramic sintered body having the structure described above will now be explained.

The ceramic sintered body can be produced by firing a mixture of silicon carbide and starting materials capable of forming solid lubricants A and B after firing (hereinafter referred to as "starting mixture"). The minimal starting materials for the solid lubricants are a starting material that forms solid lubricant A with a mean particle size of no greater than 5 μm after firing (hereinafter referred to as "starting material A") and a starting material that forms solid lubricant B with a mean particle size of 10-70 μm after firing (hereinafter referred to as "starting material B").

The silicon carbide in the starting mixture is preferably α-silicon carbide (αSiC) as mentioned above, and specifically it is preferably silicon carbide powder. The mean particle size of the silicon carbide powder is preferably at least 0.1 μm, more preferably 0.3-1.0 μm and even more preferably 0.5-0.8 μm. If the mean particle size of the silicon carbide powder is less than 0.1 μm, it will become difficult to manage and the ceramic sintered body production steps will be more complex, while manufacturing cost may be increased due to the high cost of such silicon carbide powder. If it exceeds 1.0 μm, on the other hand, it will tend to be more difficult to accomplish sintering during the firing.

When solid lubricant A is graphite, the starting material A may be a material that produces graphite with a mean particle size of no greater than 5 μm by firing. Examples of such materials include carbon black and thermosetting resins. When starting material A contains carbon black, the carbon black preferably has a mean particle size of no greater than 150 nm and more preferably no greater than 50 nm. Such carbon black can satisfactorily yield graphite with a mean particle size of no greater than 5 μm by firing. As thermosetting resins that can be used as starting material A there may be mentioned phenol resins and furan resins, with phenol resins being preferred.

Starting material A preferably contains both carbon black and a thermosetting resin. In this case, it preferably further contains graphite with a mean particle size of no greater than 5 μm in addition to those components. Such graphite has low variation in mean particle size after firing, and can itself serve as the graphite with a mean particle size of no greater than 5 μm in the ceramic sintered body.

The content of starting material A in the starting mixture is adjusted so that the content of solid lubricant A in the ceramic sintered body is within the preferred range specified above. For example, when starting material A contains both carbon black and a thermosetting resin, the carbon black is preferably present at 2-8 parts by weight with respect to 100 parts by weight of silicon carbide in the starting mixture, while the thermosetting resin is preferably present at 1-3 parts by weight in terms of carbon with respect to 100 parts by weight of silicon carbide. The content "in terms of carbon" means the content of carbon in the thermosetting resin with respect to 100 parts by weight of silicon carbide.

When solid lubricant B is graphite, starting material B is preferably graphite with a mean particle size of 10-70 μm. Such graphite is more preferably artificial graphite. Such graphite (especially artificial graphite) does not undergo significant change in mean particle size with firing, and it can therefore serve as graphite with a mean particle size of 10-70 μm in the fired ceramic sintered body.

Since the content of graphite (artificial graphite) with a mean particle size of 10-70 μm in the starting mixture does not vary significantly before and after firing, it may be the same as the content of solid lubricant B in the ceramic sintered body. Specifically, the preferred content of graphite with a mean particle size of 10-70 μm is 2-8 parts by weight, more preferably 2-6 parts by weight and even more preferably 3-6 parts by weight with respect to 100 parts by weight of silicon carbide.

The starting mixture contains silicon carbide, starting material A and starting material B, but may also contain a binder or dispersing agent if necessary.

The ceramic sintered body can be obtained by firing the starting mixture described above. For example, the starting mixture may be dried (by spray-drying, for example) before firing and then shaped to prepare the starting mixture into the prescribed shape before firing. The obtained compact may then be fired to obtain a ceramic sintered body.

The firing may be carried out under pressure or without pressure. Because the starting mixture according to this embodiment contains a combination of (fine) starting material A with a small particle size and (coarse) starting material B with a large particle size, it yields a sintered body with a sufficiently dense structure even under non-pressurized conditions. When even greater denseness is required for the ceramic sintered body, however, the firing is preferably carried out under pressure.

The firing temperature is preferably in the range of 2100-2300° C., more preferably in the range of 2130-2270° C. and even more preferably in the range of 2150-2250° C. A firing temperature of below 2100° C. may render it difficult to obtain a dense ceramic sintered body. A temperature of above 2300° C., on the other hand, will tend to result in excessively long silicon carbide crystal particles, thus reducing the strength. Because it is difficult to directly measure the temperature of fired objects, the firing temperature may be recorded as the temperature obtained by measurement with a thermal radiation thermometer when a carbonaceous firing jig, for example, is used during the firing.

A ceramic sintered body having the construction described above exhibits excellent sliding properties and is therefore suitable as a sliding part to be used in a non-lubricated state, for example. Examples of sliding parts include mechanical seals, bearings and the like.

Figure 6:
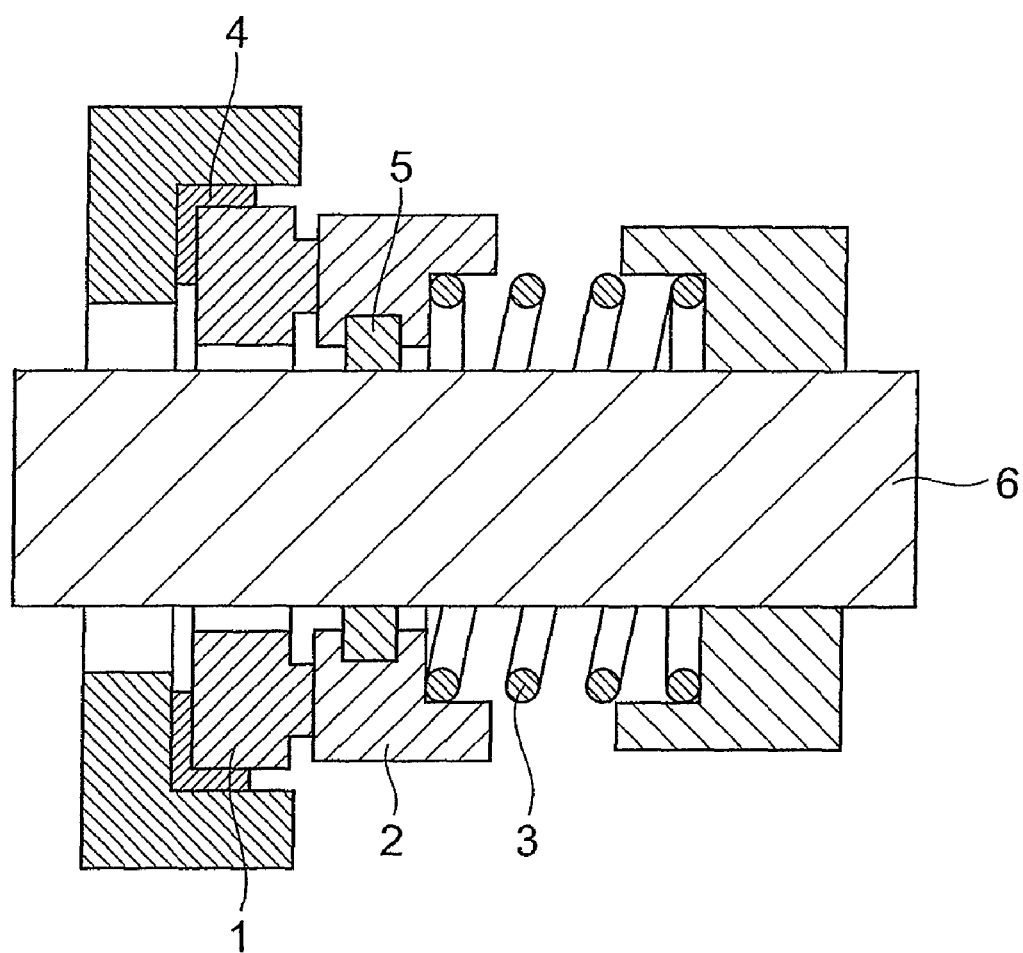
FIG. 6 is a schematic drawing of an example of the cross-sectional structure of a mechanical seal.

A preferred embodiment of a mechanical seal will now be explained as an example of a sliding part. FIG. 6 is a schematic drawing of an example of the cross-sectional structure of a mechanical seal. As depicted in this drawing, the mechanical seal 10 is provided with a mating ring 1, seal ring 2 and coiled spring 3 arranged in that order, and a rotation axis 6 is positioned running through their approximate center. On the outside of the mating ring 1 there is positioned a fixed secondary seal 4, and in the gap between the seal ring 2 and rotation axis 6 there is positioned a rotating secondary seal 5 filling the gap.

In this mechanical seal 10, the seal ring 2 is pressed against the mating ring 1 by the spring 3. A constant pressure is therefore applied between the mating ring 1 and seal ring 2, thus limiting the flow of fluid.

In the mechanical seal 10 having this construction, the mating ring 1 is fixed while the seal ring 2 can be rotated together with the rotation axis 6. Leakage between the mating ring 1 and seal ring 2 is therefore limited, as explained above. Therefore, if the mechanical seal 10 is applied at a seal end, it is possible to rotate the rotation axis 6 while preventing leakage of fluid at the rotating sections.

The mating ring 1 and/or seal ring 2 in this type of mechanical seal 10 are composed of ceramic sintered bodies according to the embodiment described above. As mentioned above, the ceramic sintered bodies exhibit excellent sliding properties and are therefore resistant to wear caused by friction due to the relative rotation of the mating ring 1 and seal ring 2. The mechanical seal 10 having this construction can thus maintain excellent seal properties with prolonged use.

The ceramic sintered body of this embodiment contains silicon carbide as the parent material, and also solid lubricant A with a mean particle size of no greater than 5 μm and solid lubricant B with a mean particle size of 10-70 μm either in the grains, at the grain boundaries, or both.

Addition of the solid lubricants in greater amounts and with larger particle sizes will provide a more excellent effect of lowering the frictional coefficient. Consequently, the effect of lowering the frictional coefficient is less satisfactory with ordinary addition of a fine solid lubricant, such as graphite formed by sintering of carbon black, as compared to a coarse solid lubricant. An increased amount of addition is therefore necessary when it is desired to achieve improved sliding properties using a fine solid lubricant, and for example, adding large amounts of carbon black does not yield a dense sintered body after firing and also results in the disadvantage of insufficient sealing properties.

On the other hand, including a coarse solid lubricant produces excellent sliding properties but results in a ceramic sintered body that is more susceptible to cracking. It is believed that this occurs because the composite material comprising a solid lubricant added to silicon carbide as the parent material is no longer a homogeneous material, and for example, when the pressure is released after the pressing step during production of the sintered body, the difference in elastic behaviors of the parent material and solid lubricant creates local tensile stress in the parent material. Coarse solid lubricants produce notably greater tensile stress and therefore tend to promote cracking.

The ceramic sintered body of this embodiment which contains both a fine solid lubricant and a coarse solid lubricant minimizes the disadvantages encountered when using only one of the two and thus provides an excellent effect. Firstly, the presence of the coarse solid lubricant allows excellent sliding properties to be exhibited with a smaller addition of the fine solid lubricant. The reduced amount of fine solid lubricant permits a dense sintered body to be obtained without excessive inhibition of sintering.

Moreover, since the fine solid lubricant evenly disperses in the silicon carbide parent material, a composite parent material with silicon carbide (SiC/C) can presumably form during press molding. As a result, the reduced difference in elastic behavior between the composite parent material and the coarse solid lubricant minimizes cracking during production of the ceramic sintered body, compared to only a coarse solid lubricant alone.

EXAMPLES

The present invention will now be explained in greater detail through the following examples, with the understanding that these examples are in no way limitative on the invention.

[Production of Ceramic Sintered Body]

Ceramic sintered bodies for Examples 1-8 and Comparative Examples 1-12 were fabricated. The steps carried out for production of all of the ceramic sintered bodies of the examples and comparative examples will be explained first. The following steps A-E were carried out for production of the ceramic sintered bodies. These steps are summarized in the flow chart of FIG. 1.

Step A: The prescribed starting components were blended to prepare a starting mixture, and ion-exchanged water was added thereto to produce a slurry with a concentration of 20 vol %, after which the pH of the slurry was adjusted to 8-10.

Step B: The slurry was mixed with a resin ball mill for 5 hours, and then a spray drier was used for spray-drying under conditions with an inlet temperature of 160° C. and a rotation rate of 7000 min$^{-1}$, to form approximately 70 μm granules.

Step C: The obtained granules were passed through a 210 μm sieve (65 mesh) to obtain a molding powder.

Step D: The molding powder was packed into a die for molding at a pressure of 120 MPa into a disc shape with an outer diameter of 33 mm and a thickness of 6 mm.

Step E: The compact was sintered using a controlled atmosphere kiln with an argon atmosphere inside the kiln, and the prescribed maximum temperature was maintained for 2 hours.

The starting materials for the solid lubricants in the following examples and comparative examples were graphite (artificial graphite or natural graphite) that forms coarse-grain graphite after firing, and carbon black or artificial graphite that produces fine graphite after firing.

Figure 2:
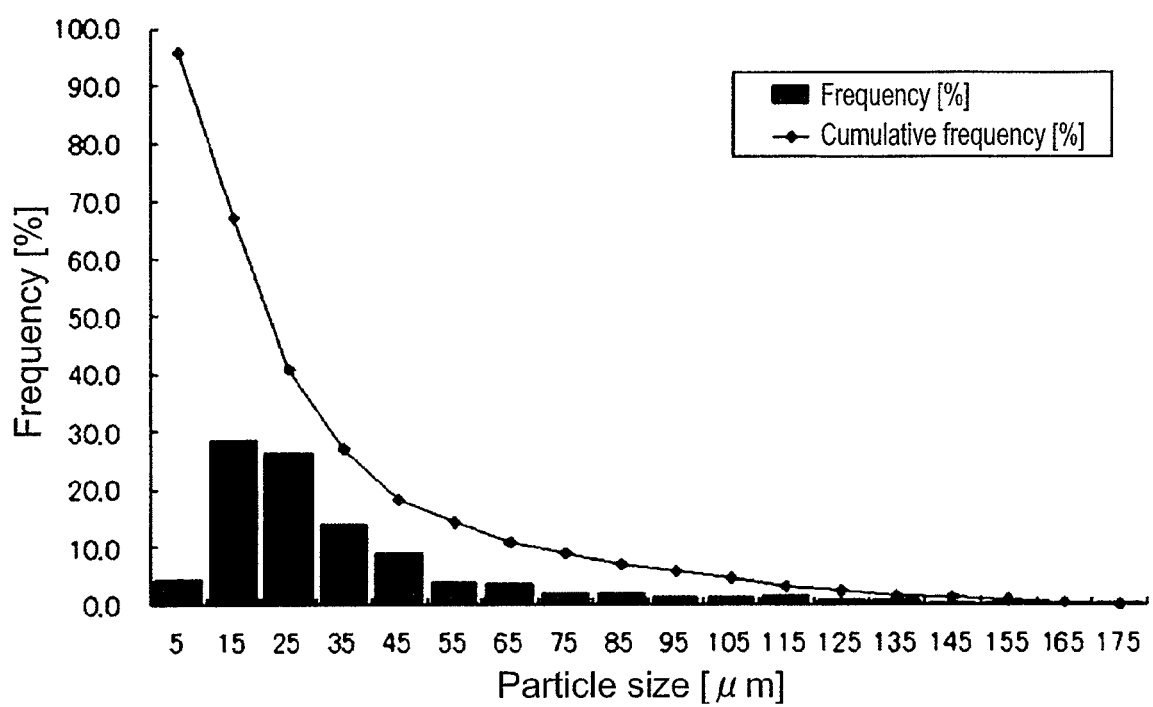
FIG. 2 is a graph showing the particle size distribution of the graphite used in the examples and comparative examples.

The results of measuring the particle size distribution of an artificial graphite starting component (catalog mean particle size of graphite: 30 μm) are shown in FIG. 2 for reference. As seen in FIG. 2, the graphite starting component was confirmed to have a wide particle size distribution.

Figure 3:
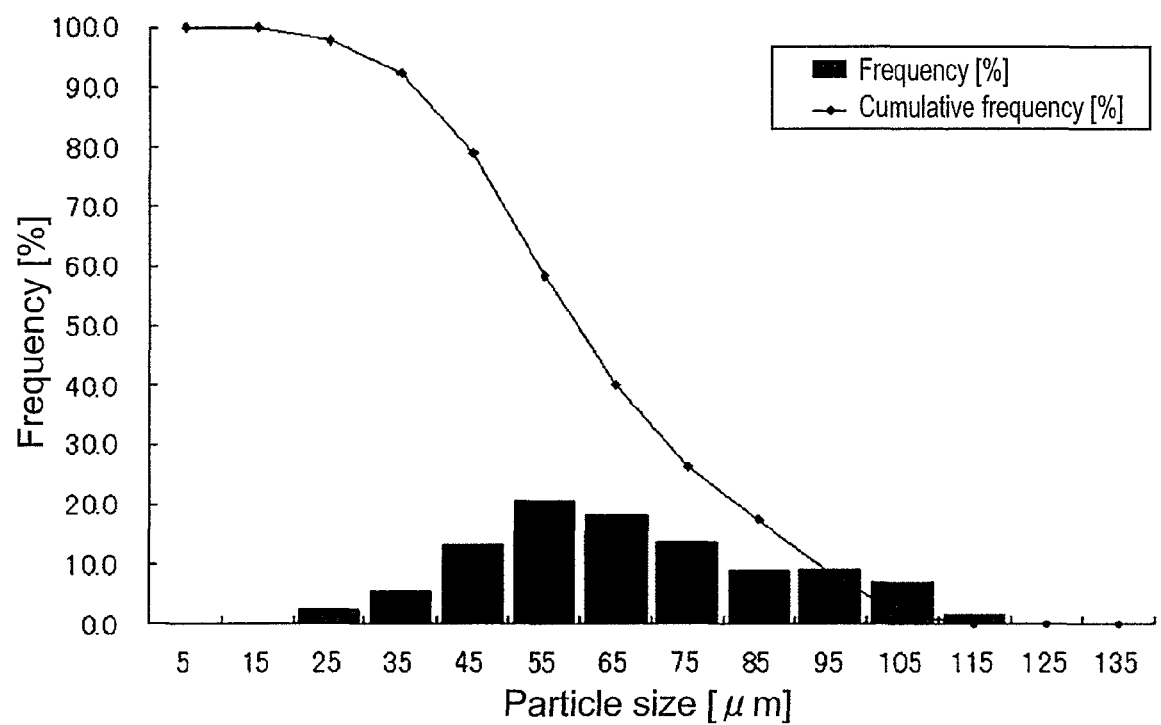
FIG. 3 is a graph showing the particle size distribution of the molding powders obtained in Example 1.

The results of measuring the particle size distribution of the molding powder obtained in Step C of Example 1 are shown in FIG. 3 as an example. As seen in FIG. 3, the particle size of the molding powder was concentrated between 40-100 μm.

The carbon black was granular and the catalog value was used as the mean particle size.

After production of the ceramic sintered body, the mean particle sizes of the graphite and pores in the sintered body were determined by applying the mean particle size measuring method described above to a sintered body lapped to an extent allowing confirmation of the particle size.

The production processes for the ceramic sintered bodies of Examples 1-8 and Comparative Examples 1-12 will now be explained in detail. The following explanation omits description of the steps and parts that correspond to those described above. The types, mean particle sizes and contents of the starting materials (artificial graphite, natural graphite, carbon black) for the solid lubricants of the examples and comparative examples, as well as the mean particle sizes and contents of the pore-forming materials used in the examples and comparative examples, are summarized in Table 1.

Example 1

In Step A, 4 parts by weight of artificial graphite with a mean particle size of 30 μm and 3 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2190° C.

No cracking was found upon observing the obtained sintered body. Also, as a result of observing the structure of fractured and lapped surfaces of the sintered body, graphites with two different mean particle sizes, 2 μm and 30 μm, were found in the silicon carbide parent material.

Example 2

In Step A, 6 parts by weight of artificial graphite with a mean particle size of 30 μm and 3 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

No cracking was found upon observing the obtained sintered body. Also, as a result of observing the structure of fractured and lapped surfaces of the sintered body, graphites with two different mean particle sizes, 2 μm and 30 μm, were found in the silicon carbide parent material.

Example 3

In Step A, 3 parts by weight of artificial graphite with a mean particle size of 50 μm and 4 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

No cracking was found upon observing the obtained sintered body. Also, as a result of observing the structure of fractured and lapped surfaces of the sintered body, graphites with two different mean particle sizes, 2 μm and 50 μm, were found in the silicon carbide parent material.

Example 4

In Step A, 3 parts by weight of artificial graphite with a mean particle size of 70 μm and 5 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2210° C.

No cracking was found upon observing the obtained sintered body. Also, as a result of observing the structure of fractured and lapped surfaces of the sintered body, graphites with two different mean particle sizes, 2 μm and 70 μm, were found in the silicon carbide parent material.

Example 5

In Step A, 2 parts by weight of artificial graphite with a mean particle size of 30 μm, 3 parts by weight of carbon black with a mean particle size of 43 nm and 1.5 part by weight of a spheroid pore-forming material composed of polymethyl methacrylate (PMMA) with a mean particle size of 60 μm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2190° C.

No cracking was found upon observing the obtained sintered body. Also, as a result of observing the structure of fractured and lapped surfaces of the sintered body, graphite with two different mean particle sizes, 2 μm and 30 μm, and spheroid pores with a mean particle size of 50 μm were found in the silicon carbide parent material.

Example 6

In Step A, 4 parts by weight of artificial graphite with a mean particle size of 30 μm, 3 parts by weight of carbon black with a mean particle size of 43 μm and 1.5 part by weight of a spheroid pore-forming material composed of polymethyl methacrylate (PMMA) with a mean particle size of 60 μm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2220° C.

No cracking was found upon observing the obtained sintered body. Also, as a result of observing the structure of fractured and lapped surfaces of the sintered body, graphite with two different mean particle sizes, 2 μm and 30 μm, and spheroid pores with a mean particle size of 50 μm were found in the silicon carbide parent material.

Example 7

In Step A, 6 parts by weight of artificial graphite with a mean particle size of 30 μm, 3 parts by weight of carbon black with a mean particle size of 43 nm and 1.5 part by weight of a spheroid pore-forming material composed of polymethyl methacrylate (PMMA) with a mean particle size of 60 μm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2220° C.

No cracking was found upon observing the obtained sintered body. Also, as a result of observing the structure of fractured and lapped surfaces of the sintered body, graphite with two different mean particle sizes, 2 μm and 30 μm, and spheroid pores with a mean particle size of 50 μm were found in the silicon carbide parent material.

Example 8

In Step A, 4 parts by weight of artificial graphite with a mean particle size of 30 μm and 4 parts by weight of carbon black with a mean particle size of 120 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2210° C.

No cracking was found upon observing the obtained sintered body. Also, as a result of observing the structure of fractured and lapped surfaces of the sintered body, graphites with two different mean particle sizes, 3 μm and 30 μm, were found in the silicon carbide parent material.

Comparative Example 1

In Step A, 1.5 part by weight of a spheroid pore-forming material composed of polymethyl methacrylate (PMMA) with a mean particle size of 60 μm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2160° C.

No cracking was found upon observing the obtained sintered body. Also, as a result of observing the structure of fractured and lapped surfaces of the sintered body, spheroid pores with a mean particle size of 50 μm were found in the silicon carbide parent material.

Comparative Example 2

In Step A, 8 parts by weight of carbon black with a mean particle size of 43 nm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2210° C.

No cracking was found upon observing the obtained sintered body. Also, as a result of observing the structure of fractured and lapped surfaces of the sintered body, graphite with a mean particle size of 2 μm was found in the silicon carbide parent material.

Comparative Example 3

In Step A, 16 parts by weight of carbon black with a mean particle size of 43 nm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2230° C.

No cracking was found upon observing the obtained sintered body. Also, as a result of observing the structure of fractured and lapped surfaces of the sintered body, graphite with a mean particle size of 2 μm was found in the silicon carbide parent material.

Comparative Example 4

In Step A, 24 parts by weight of carbon black with a mean particle size of 43 nm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2230° C.

No cracking was found upon observing the obtained sintered body. Also, as a result of observing the structure of fractured and lapped surfaces of the sintered body, graphite with a mean particle size of 2 μm was found in the silicon carbide parent material.

Comparative Example 5

In Step A, 6 parts by weight of artificial graphite with a mean particle size of 130 μm and 3 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2210° C.

Upon observing the obtained sintered body, cracking was found on the sides thereof. Also, as a result of observing the structure of fractured and lapped surfaces of the sintered body, graphites with two different mean particle sizes, 2 μm and 130 μm, were found in the silicon carbide parent material.

Comparative Example 6

In Step A, 12 parts by weight of artificial graphite with a mean particle size of 30 μm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2230° C.

Upon observing the obtained sintered body, cracking was found on the sides thereof. Also, as a result of observing the structure of fractured and lapped surfaces of the sintered body, graphite with a mean particle size of 30 μm was found in the silicon carbide parent material.

Comparative Example 7

In Step A, 6 parts by weight of artificial graphite with a mean particle size of 7 μm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

No cracking was found upon observing the obtained sintered body. Also, as a result of observing the structure of fractured and lapped surfaces of the sintered body, graphite with a mean particle size of 7 μm was found in the silicon carbide parent material.

Comparative Example 8

In Step A, 6 parts by weight of natural graphite with a mean particle size of 8 μm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

No cracking was found upon observing the obtained sintered body. Also, as a result of observing the structure of fractured and lapped surfaces of the sintered body, graphite with a mean particle size of 8 μm was found in the silicon carbide parent material.

Comparative Example 9

In Step A, 6 parts by weight of artificial graphite with a mean particle size of 30 μm was added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

Upon observing the obtained sintered body, cracking was found on the sides thereof. Also, as a result of observing the structure of fractured and lapped surfaces of the sintered body, graphite with a mean particle size of 30 μm was found in the silicon carbide parent material.

Comparative Example 10

In Step A, 4 parts by weight of artificial graphite with a mean particle size of 30 μm and 1.5 part by weight of a spheroid pore-forming material composed of polymethyl methacrylate (PMMA) with a mean particle size of 60 μm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400).

In Step E, the compact was sintered at 2200° C.

Upon observing the obtained sintered body, cracking was found on the sides thereof. Also, as a result of observing the structure of fractured and lapped surfaces of the sintered body, graphite with a mean particle size of 30 μm and spheroid pores with a mean particle size of 50 μm were found in the silicon carbide parent material.

Comparative Example 11

In Step A, 3 parts by weight of artificial graphite with a mean particle size of 90 μm and 2 parts by weight of carbon black with a mean particle size of 43 nm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

Upon observing the obtained sintered body, cracking was found on the sides thereof. Also, as a result of observing the structure of fractured and lapped surfaces of the sintered body, graphites with two different mean particle sizes, 2 μm and 90 μm, were found in the silicon carbide parent material.

Comparative Example 12

In Step A, 4 parts by weight of artificial graphite with a mean particle size of 30 μm and 3 parts by weight of artificial graphite with a mean particle size of 7 μm were added to 100 parts by weight of silicon carbide powder with a mean particle size of 0.7 μm. There were further added 0.6 part by weight of boron carbide as a sintering aid, 2 parts by weight of a phenol resin in terms of carbon, 3 parts by solid weight of polyvinyl alcohol as a binder and 0.6 part by weight of polyethylene glycol (polymerization degree: #400). A starting mixture was thus obtained.

In Step E, the compact was sintered at 2200° C.

Upon observing the obtained sintered body, cracking was found on the sides thereof. Also, as a result of observing the structure of fractured and lapped surfaces of the sintered body, graphites with two different mean particle sizes, 7 μm and 30 μm, was found in the silicon carbide parent material.

TABLE 1

| | Starting materials of solid lubricants | | | | | | | |
|---|---|---|---|---|---|---|---|---|
| | Graphite | | | Carbon black | | | Pore-forming material | |
| | Type | Mean particle size (μm) | Content (parts by wt.) | Type | Mean particle size (μm) | Content (parts by wt.) | Mean particle size (μm) | Content (parts by wt.) |
| Example 1 | Artificial graphite | 30 | 4 | Carbon black | 43 | 3 | — | — |
| Example 2 | Artificial graphite | 30 | 6 | Carbon black | 43 | 3 | — | — |
| Example 3 | Artificial graphite | 50 | 3 | Carbon black | 43 | 4 | — | — |
| Example 4 | Artificial graphite | 70 | 3 | Carbon black | 43 | 5 | — | — |
| Example 5 | Artificial graphite | 30 | 2 | Carbon black | 43 | 3 | 60 | 1.5 |
| Example 6 | Artificial graphite | 30 | 4 | Carbon black | 43 | 3 | 60 | 1.5 |
| Example 7 | Artificial graphite | 30 | 6 | Carbon black | 43 | 3 | 60 | 1.5 |
| Example 8 | Artificial graphite | 30 | 4 | Carbon black | 120 | 4 | — | — |
| Comp. Ex. 1 | — | — | — | — | — | — | 60 | 1.5 |
| Comp. Ex. 2 | Artificial graphite | — | — | Carbon black | 43 | 8 | — | — |
| Comp. Ex. 3 | Artificial graphite | — | — | Carbon black | 43 | 16 | — | — |
| Comp. Ex. 4 | Artificial graphite | — | — | Carbon black | 43 | 24 | — | — |
| Comp. Ex. 5 | Artificial graphite | 130 | 6 | Carbon black | 43 | 3 | — | — |

TABLE 1-continued

| | Starting materials of solid lubricants | | | | | | Pore-forming material | |
|---|---|---|---|---|---|---|---|---|
| | Graphite | | | Carbon black | | | | |
| | Type | Mean particle size (μm) | Content (parts by wt.) | Type | Mean particle size (μm) | Content (parts by wt.) | Mean particle size (μm) | Content (parts by wt.) |
| Comp. Ex. 6 | Artificial graphite | 30 | 12 | — | — | — | — | — |
| Comp. Ex. 7 | Artificial graphite | 7 | 6 | — | — | — | — | — |
| Comp. Ex. 8 | Natural graphite | 8 | 6 | — | — | — | — | — |
| Comp. Ex. 9 | Artificial graphite | 30 | 6 | — | — | — | — | — |
| Comp. Ex. 10 | Artificial graphite | 30 | 4 | — | — | — | 60 | 1.5 |
| Comp. Ex. 11 | Artificial graphite | 90 | 3 | Carbon black | 43 | 3 | — | — |
| Comp. Ex. 12 | Artificial graphite | 30 | 4 | Artificial graphite | 7 (μm) | 3 | — | — |

[Evaluation of Physical Properties]

First, the sintered bodies obtained in the examples and comparative examples were used for a sliding evaluation test in a non-lubricated state according to the following method. The sintered body shaped as a disk was rubbed for use as the fixed end test piece. A ring (outer diameter: 24.6 mm(φ)×15.5 mm(φ)×thickness: 3 mm) made of silicon carbide (Hexoloy SA, trade name of Saint-Gobain) that had been rubbed on the sliding surface was prepared as the rotating end test piece. Using a frictional abrasion tester prepared by modifying a pin-on-disk frictional abrasion tester (AFT-6S, product of Toyo Baldwin Co., Ltd.) into a ring-on-disk type, the sliding surface of the rotating end test piece was contacted with one side of the fixed end test piece and rotated as a dry sliding evaluation test. The test conditions were 5 minutes with a sliding surface pressure of 0.15 MPa and a circumferential speed of 1.0 m/s.

The sintered body (fixed end test piece) was observed after the sliding evaluation test to examine the sliding surface condition and the presence of any cracks in the sintered body, and to measure the open porosity of the sintered body. The results for the sintered bodies of the examples and comparative examples are summarized in Table 2. The open porosity was measured by the boiling method described in JIS R1634, "Test methods for density and apparent porosity of fine ceramics".

TABLE 2

| Sintered body | Condition of sliding surface after sliding test | Cracks in sintered body | Open porosity (%) |
|---|---|---|---|
| Example 1 | Good | Absent | 0.3 |
| Example 2 | Good | Absent | 0.4 |
| Example 3 | Good | Absent | 0.6 |
| Example 4 | Good | Absent | 0.6 |
| Example 5 | Slight surface roughness | Absent | 0.2 |
| Example 6 | Good | Absent | 0.4 |
| Example 7 | Good | Absent | 0.5 |
| Example 8 | Good | Absent | 0.6 |
| Comp. Ex. 1 | Surface roughness | Absent | 0.1 |
| Comp. Ex. 2 | Surface roughness | Absent | 0.4 |
| Comp. Ex. 3 | Surface roughness | Absent | 0.4 |
| Comp. Ex. 4 | Good | Absent | 12.4 |
| Comp. Ex. 5 | Good | Present | 2.3 |
| Comp. Ex. 6 | Good | Present | 3.1 |
| Comp. Ex. 7 | Surface roughness | Absent | 0.3 |
| Comp. Ex. 8 | Surface roughness | Absent | 0.1 |
| Comp. Ex. 9 | Good | Present | 0.7 |
| Comp. Ex. 10 | Good | Present | 0.8 |
| Comp. Ex. 11 | Good | Present | 1.6 |
| Comp. Ex. 12 | Good | Present | 1.0 |

Table 2 shows that the sintered bodies of Examples 1-4 and 6-8 exhibited no cracking and no surface roughness even after the sliding evaluation test in a non-lubricated state. The sintered body of Example 5 exhibited some moderate surface roughness but no cracking.

In contrast, the sintered body of Comparative Example 1 exhibited no cracking, but because it did not contain a solid lubricant, surface roughness was observed after the sliding property test. The sintered bodies of Comparative Examples 2, 3, 7 and 8 also exhibited no cracking, but because of the fine graphite in the sintered bodies their sliding properties were inadequate and the sliding surfaces were rough.

The sintered bodies of Comparative Examples 4 and 6 exhibited no sliding surface roughness, but because they contained large amounts of only fine graphite, sintering of the silicon carbide parent materials was inadequate and the open porosity was high. Such materials with high open porosity are generally prone to problems such as penetration leaks when used as mechanical seals.

The sintered bodies of Comparative Examples 5 and 11 contained graphite with excessively large particle sizes (mean particle size of 130 μm or 90 μm), and therefore cracking occurred despite satisfactory sliding properties. Also, the sintered bodies of Comparative Examples 9 and 10 exhibited no cracking, but because they contained only coarse graphite, cracking occurred on the sides despite satisfactory sliding properties. The sintered body of Comparative Example 12 had large particle sizes of 7 μm and greater even for the smaller graphite it contained, and therefore cracking occurred in the sintered body.

Figure 4:
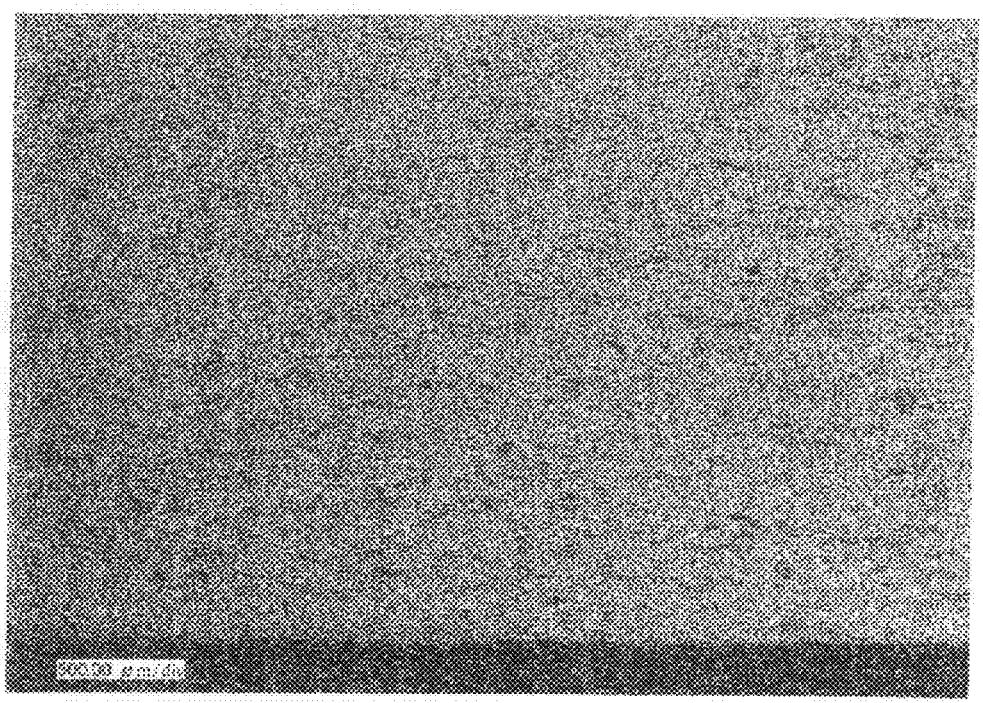
FIG. 4 is a photomicrograph showing a side of the sintered body obtained in Comparative Example 10.
Figure 5:
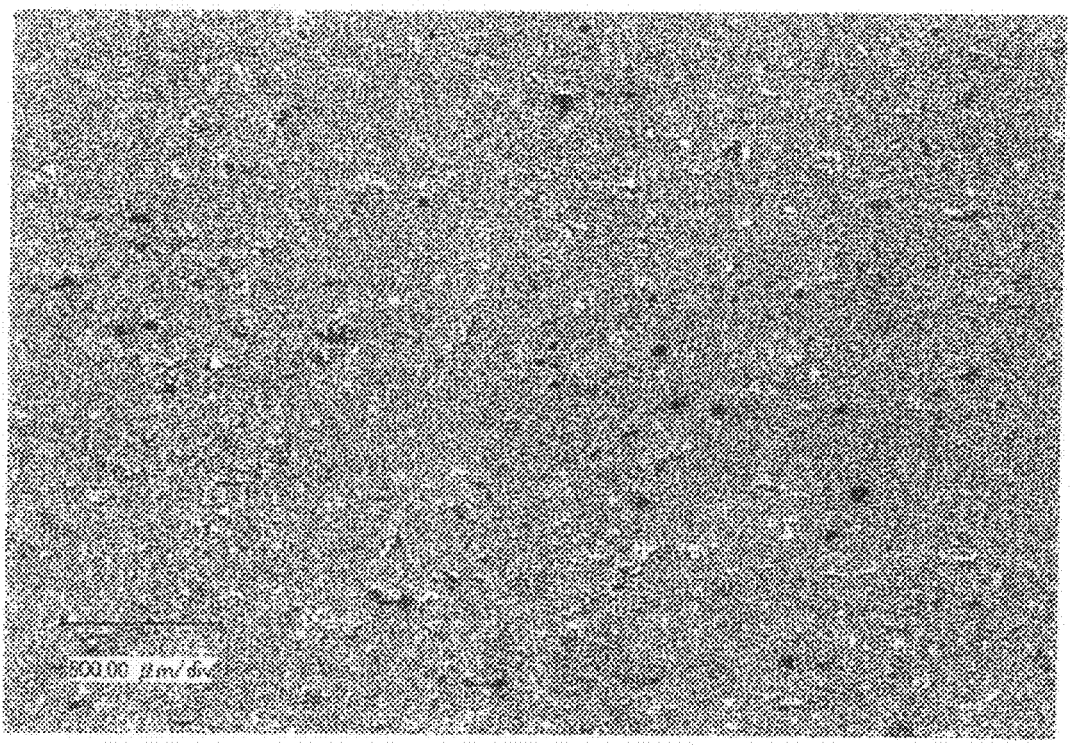
FIG. 5 is a photomicrograph showing a side of the sintered body obtained in Example 6.

FIG. 4 shows a photomicrograph of the side of the sintered body of Comparative Example 10, and FIG. 5 shows a photomicrograph of the side of the sintered body of Example 6, for illustration. Numerous cracks can be seen in the side of the sintered body shown in FIG. 4, compared to the side of the sintered body shown in FIG. 5.

The sintered body containing only coarse graphite therefore exhibited satisfactory sliding properties but contained numerous cracks. It was thus demonstrated that inhibiting cracks by addition of fine graphite is an effective method for solving the problem of cracking.

The invention claimed is:

1. A ceramic sintered body comprising silicon carbide as the parent material, and also a solid lubricant A with a mean particle size of no greater than 5 μm and a solid lubricant B with a mean particle size of 10-70 μm, wherein the ceramic sintered body contains solid lubricant A at 4-10 parts by weight and solid lubricant B at 2-8 parts by weight with respect to 100 parts by weight of silicon carbide.

2. A ceramic sintered body according to claim 1, wherein solid lubricant A and solid lubricant B are composed of graphite.

3. A ceramic sintered body according to claim 1, wherein solid lubricant A is composed of graphite obtained by firing carbon black and graphite obtained by firing a thermosetting resin.

4. A ceramic sintered body according to claim 1, wherein solid lubricant B is composed of artificial graphite.

5. A ceramic sintered body according to claim 1, wherein the total content of the solid lubricant A and solid lubricant B in the ceramic sintered body of the invention is 5-15 parts by weight with respect to 100 parts by weight of silicon carbide.

6. A ceramic sintered body according to claim 1, wherein the relative density is 92% or greater.

7. A ceramic sintered body according to claim 1, which is sintered without pressure.

8. A ceramic sintered body according to claim 1, wherein the silicon carbide is αSiC.

9. A sliding part employing a ceramic sintered body according to claim 1.

10. A ceramic sintered body production process comprising a step of firing a mixture containing 2-8 parts by weight of carbon black with a mean particle size of no greater than 150 nm, 2-8 parts by weight of artificial graphite with a mean particle size of 10-70 μm and 2-3 parts by weight of a thermosetting resin in terms of carbon, with respect to 100 parts by weight of silicon carbide powder.

11. A ceramic sintered body production process according to claim 10, wherein the thermosetting resin contains a phenol resin and/or furan resin.

12. A ceramic sintered body according to claim 1, which contains spherical pores.

13. A ceramic sintered body according to claim 12, wherein the spherical pores have a mean pore size of 40-100 μm.

14. A ceramic sintered body according to claim 1, wherein the solid lubricant A and the solid lubricant B are either in grains of the silicon carbide as the parent material, between the grains, or both.

* * * * *